United States Patent
Gao et al.

(10) Patent No.: US 11,249,624 B2
(45) Date of Patent: Feb. 15, 2022

(54) METHOD FOR CAPTURING AN IMAGE, TERMINAL AND STORAGE MEDIUM THEREOF

(71) Applicant: GUANGZHOU BAIGUOYUAN NETWORK TECHNOLOGY CO., LTD., Guangzhou (CN)

(72) Inventors: Sheng Gao, Guangzhou (CN); Li Liu, Guangzhou (CN); Yue Ma, Guangzhou (CN); Jiaxiong Cheng, Guangzhou (CN); Xin Tong, Guangzhou (CN); Jiebo Ma, Guangzhou (CN)

(73) Assignee: BIGO TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 17/048,780

(22) PCT Filed: Dec. 27, 2018

(86) PCT No.: PCT/CN2018/124506
§ 371 (c)(1),
(2) Date: Oct. 19, 2020

(87) PCT Pub. No.: WO2019/205703
PCT Pub. Date: Oct. 31, 2019

(65) Prior Publication Data
US 2021/0149536 A1   May 20, 2021

(30) Foreign Application Priority Data
Apr. 28, 2018   (CN) .......................... 201810412069.3

(51) Int. Cl.
*A63F 13/86*   (2014.01)
*G06F 3/0484*   (2022.01)
(Continued)

(52) U.S. Cl.
CPC ............ *G06F 3/0484* (2013.01); *A63F 13/86* (2014.09); *G06F 9/451* (2018.02); *G06T 9/00* (2013.01)

(58) Field of Classification Search
CPC ............... A63F 13/86; A63F 2300/308; H04N 5/23222; H04N 21/8173
See application file for complete search history.

(56) References Cited

U.S. PATENT DOCUMENTS

| | | | |
|---|---|---|---|
| 10,843,071 B2 * | 11/2020 | Nomura | .................. A63F 13/86 |
| 11,036,458 B2 * | 6/2021 | Schmidt | ............... H04N 21/472 |
| 2007/0081080 A1 | 4/2007 | Peterson et al. | |

FOREIGN PATENT DOCUMENTS

| | | |
|---|---|---|
| CN | 101834992 A | 9/2010 |
| CN | 103761025 A | 4/2014 |

(Continued)

OTHER PUBLICATIONS

Machine Translation of CN 104333769 (Year: 2015).*
(Continued)

*Primary Examiner* — Alvin H Tan
(74) *Attorney, Agent, or Firm* — Dilworth & Barrese, LLP.; Michael J. Musella, Esq.

(57) ABSTRACT

A method for capturing an image is disclosed in the present disclosure. The method includes: detecting first information associated with a first application that is running, wherein the first information is configured to characterize an attribute of the first application; capturing an image output by the first application in a capturing fashion associated with the image output by the first application based on a first capturing policy in the case that the first information associated with the first application exists in the first database; capturing the image output by the first application based on a second capturing policy in the case that the first information asso- (Continued)

ciated with the first application does not exist in the first database. The present disclosure also discloses a terminal and a storage medium.

20 Claims, 3 Drawing Sheets

(51) Int. Cl.
  *G06F 9/451* (2018.01)
  *G06T 9/00* (2006.01)

(56) References Cited

FOREIGN PATENT DOCUMENTS

CN   104333769 A   2/2015
CN   108932142 A   12/2018

OTHER PUBLICATIONS

International Search Report of PCT application No. PCT/CN2018/124506 dated Mar. 14, 2019.
First Office Action of Chinese Application No. 201810412069.3 dated Mar. 28, 2019.
Second Office Action of Chinese Application No. 201810412069.3 dated Oct. 8, 2019.
Notification to grant patent for invention of Chinese application No. 201810412069.3 dated Feb. 3, 2020.

\* cited by examiner

METHOD FOR CAPTURING AN IMAGE, TERMINAL AND STORAGE MEDIUM THEREOF

CROSS-REFERENCE TO RELATED APPLICATION

The present disclosure is a National Stage of International Application No. PCT/CN2018/124506, filed on Dec. 27, 2018, which claims priority to Chinese patent disclosure No. 201810412069.3, filed on Apr. 28, 2018 and entitled "IMAGE CAPTURING METHOD AND TERMINAL", the entire contents of which are incorporated herein by reference.

TECHNICAL FIELD

The present disclosure relates to the technical field of video processing, and more particularly, to a method for capturing an image, a terminal and a storage medium thereof.

BACKGROUND

With the rise of live video streaming, more and more video game live streaming platforms are launched. Most live streaming video games are based on platform of Windows. To live stream a video game, video game images need to be captured first, then encoded to video streams, and pushed to a live streaming platform server in some manner. Many live streaming platforms now use Open Broadcaster Software (OBS) to perform the above functions.

SUMMARY

The present disclosure provides a method for capturing an image, a terminal and a storage medium thereof.

In a first aspect, the present disclosure provides a method for capturing an image. The method includes:
detecting first information associated with a first application that is running, wherein the first information is configured to characterize an attribute of the first application;
capturing an image output by the first application in a capturing fashion associated with the image output by the first application based on a first capturing policy in the case that the first information associated with the first application exists in the first database;
capturing the image output by the first application based on a second capturing policy in the case that the first information associated with the first application does not exist in the first database.

In another aspect, the present disclosure provides a terminal. The terminal includes:
a detecting unit, configured to detect first information associated with a first application that is running, wherein the first information is configured to characterize an attribute of the first application;
a capturing unit, configured to capture an image output by the first application in a capturing fashion associated with an image output by the first application based on a first capturing policy if the first information associated with the first application exists in the first database
the capturing unit, further configured to capture the image output by the first application based on a second capturing policy in the case that the first information associated with the first application does not exist in the first database.

In still another aspect, the present disclosure provides another terminal. The terminal includes a processor and a memory, wherein the memory is configured to store at least one application program code. The at least one application program code, when running on the terminal, enables the processor perform the following steps of a method:
detecting first information associated with a first application that is running, wherein the first information is configured to characterize an attribute of the first application;
capturing an image output by the first application in a capturing fashion associated with the image output by the first application based on a first capturing policy in the case that the first information associated with the first application exists in the first database;
capturing the image output by the first application based on a second capturing policy in the case that the first information associated with the first application does not exist in the first database.

In yet another aspect, the present disclosure provides a computer-readable storage medium storing at least one computer program that includes program instructions, wherein the computer program, when run by a processor, enables the processor to perform the method for capturing an image as defined above.

In yet another aspect, the present disclosure provides a computer program including at least one image capturing instruction, wherein the computer program, when running on a computer, enables the computer to perform the method for capturing the image as defined in the first aspect.

DETAILED DESCRIPTION

The present disclosure will be described in detail below with reference to the accompanying drawings, to present the technical solutions of the present disclosure more clearly and completely. It is apparent that the described embodiments are only a part of embodiments of the present disclosure, rather than all of the embodiments. Based on the embodiments of the present disclosure, all of the other embodiments obtained by a person of ordinary skill in the art without consuming any creative work fall within the protection scope of the present disclosure.

It should be understood that the terms "comprise" and "include", when used in this specification and the appended claims, reference may be made to the presence of described features, integration, steps, operations, elements and/or components, but do not preclude presence or addition of one or more other features, integration, steps, operations, elements and/or components and/or collection thereof.

It should also be understood that the terms used in the present specification is for the purpose of describing particular embodiments only and is not intended to limit the present disclosure. As used in the present specification and the appended claims, the singular forms "a", "an", and "the" are intended to include the plural forms as well, unless the context clearly indicates otherwise.

It should be further understood that the term "and/or" as used in the present specification and the appended claims refers to any and all possible combinations of one or more of the associated listed items and includes these combinations.

As used in the present specification and the appended claims, the term "if" may be construed to mean "when" or "upon" or "in response to determining" or "in response to detecting" depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]" depending on the context.

In a specific implementation, the terminal described in the present disclosure may include but not be limit to a mobile phone, a laptop, a tablet, or other mobile devices with a touch sensitive surface (such as touch screen display and/or touch panel). It should also be understood that, in some embodiments, the device may not be a mobile device but a desktop computer with a touch sensitive surface (such as touch screen display and/or touch panel).

In the discussion that follows, a terminal that includes a display and a touch-sensitive surface is described. It should be understood, however, that the terminal may include one or more other physical user-interface devices, such as a physical keyboard, a mouse, and/or a joystick.

The terminal supports a variety of applications, such as one or more of the following: a drawing application, a demonstration application, a word processing application, a website creation application, a disk burning application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the terminal may use at least one common physical user-interface device, such as a touch sensitive surface. One or more functions of the touch sensitive surface and corresponding information displayed on the terminal may be adjusted and/or varied among applications and/or within a corresponding application. In this way, a common physical architecture (such as the touch-sensitive surface) of the terminal may support the variety of applications with user interfaces that are intuitive and transparent to the user.

As described in the background, many video game live streaming platforms now use open source broadcast software to perform the functions mentioned above. However, it is not convenient to use OBS and the method to setup video game live streaming is complicated. For example, OBS provides three methods to capture video game images. A new OBS user who wants to capture video game images does not know which capturing fashion to select. Once a capturing fashion is selected incorrectly, it is likely that no video game images can be captured, which results in black screen during a live stream and even poor user experience.

The present disclosure provides a method for capturing an image and a terminal thereof. First, the first information associated with the first application that is running is detected. The first information is configured to characterize the attribute of the first application. Then it is determined whether the first information associated with the first application exists in the first database. The first database includes a name of an application and a capturing fashion associated with an image output by the application. Finally, if the first information associated with the first application exists in the first database, the image (video image) output by the first application is captured in the capturing fashion associated with the image output by the first application based on the first capturing policy; otherwise, the image output by the first application is captured based on the second capturing policy. According to the present disclosure, the problem that an image cannot be captured due to an incorrect capturing fashion can be solved and a black screen can be prevented from happening during live streaming of an anchor. Therefore, by means of the present disclosure, the user experience can be improved significantly.

Figure 1:
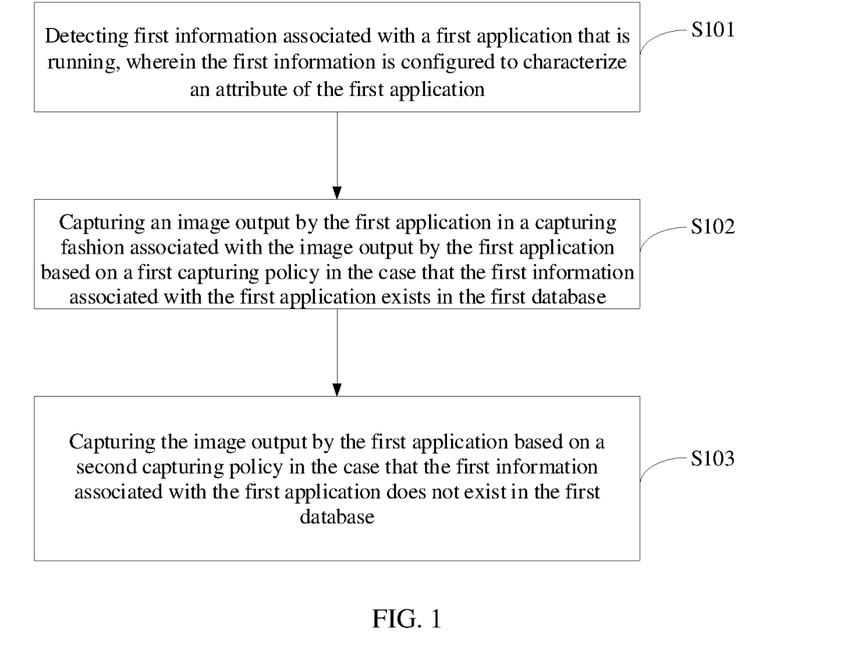
FIG. 1 is a schematic flowchart of a method for capturing an image according to the present disclosure.

FIG. 1 is a schematic flowchart of a method for capturing an image according to the present disclosure. As shown in FIG. 1, the method may include but not be limited to the following steps.

In step S101, first information associated with a first application that is running is detected, wherein the first information is configured to characterize an attribute of the first application.

In the present disclosure, it should be noted that the first application may include but not be limited to: a gaming application, a video application, or a text application, and the like. The first information in the embodiments of the present disclosure may include but not be limited to: a name of the first application, developers, a release time, a version number, a specification, contact information or contact address, and the like. That is to say, the attribute of the first application in the embodiments of the present disclosure may be the name of the first application, the developers, or the release time, and the like.

For example, if the first application is a gaming application, the first application may include but not be limited to the name of the gaming application ("League of Legends", "Angry Birds", "Super Mario Run", "Fruit Ninja", or "Rules of Survival"), the developers, the version number, the release time, or the contact information, and the like.

Taking the gaming application named "League of Legends" as an example, the first information includes the name of "League of Legends", the developer (Riot Games) of "League of Legends", the release time (Sep. 22, 2011) of "League of Legends", and the like.

In step S102, in the case that the first information associated with the first application exists in the first database, the image output by the first application in the capturing fashion associated with the image (the video image) output by the first application is captured based on the first capturing policy.

In step S103, in the case that the first information associated with the first application does not exist in the first database, the image output by the first application is captured based on the second capturing policy.

Optionally, after acquiring the first information associated with the first application, whether the first information associated with the first application exists in a first database is determined, wherein the first database may include the first information associated with an application and the capturing fashion associated with an image output by the application.

In the present disclosure, the first database may be stored in, but not limited to, the following two ways:

In the first way, the first database may be stored locally in the terminal.

In the second way, the first database may be stored in a cloud server connected to the terminal locally.

It should be noted that the first database may be established based on the recorded capturing fashions corresponding to the images output by the respective applications (such as, a gaming application) that have been successfully captured, wherein different images correspond to different capturing fashions.

Specifically, the first information associated with the first application may be compared with the data in the first database to determine whether the first information associated with the first application exists in the first database.

It should be noted that the image output by the application may support but not be limited to the two following modes:

a first mode: window mode; and a second mode: full screen mode.

The capturing fashions associated with images output by the application may include but not be limited to window capturing, display capturing, or game capturing.

It should be noted that images rendered (drawn) with different rendering technology (such as, Graphics Device Interface (GDI), Direct3D (D3D), DirectDraw (DDraw), or Open Graphics Library (OpenGL)) may correspond to different capturing fashions.

For example, window capture and display capture may capture images rendered with GDI rendering technology.

Figure 2:
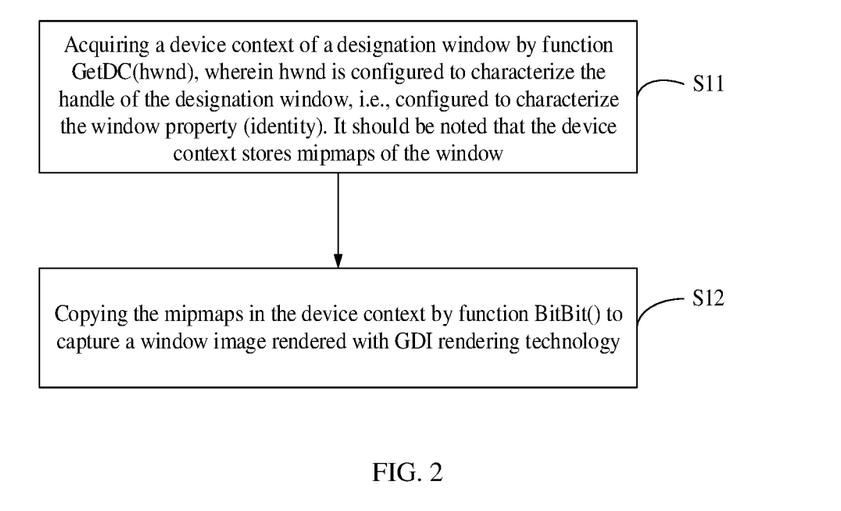
FIG. 2 is a schematic flowchart of capturing a rendered image by GDI rendering technology in a window capturing fashion according to the present disclosure.

Taking capturing an image rendered with GDI rendering technology with the window capturing fashion as an example, as shown in FIG. 2, which includes but not be limited to the following steps.

In step S11, a device context of a designation window by function GetDC(hwnd) is acquired, wherein hwnd is used to characterize the handle of the designation window, that is to say, hwnd is used to characterize the window attribute (identity). It should be noted that the device context stores mipmaps of the window.

In step S12, the mipmaps in the device context are copied by function BitBit( ) to achieve capturing a window image rendered with GDI rendering technology.

Practice of the display capturing fashion to capture a rendered image with CGI rendering technology is similar to practice of the window capturing fashion to capture a rendered image with CGI rendering technology. Herein, the handle hwnd of function GetDC(hwnd) should be set to NULL. That is to say, a full screen image rendered with GDI rendering technology may be captured in the display capturing fashion by function GetDC(NULL).

An image rendered with D3D, DDraw, or OpenGL rendering technology may be captured in the game capturing fashion.

Taking capturing an image rendered with D3D rendering technology in the game capturing fashion as an example.

Specifically, the image rendered with D3D rendering technology may be captured by application programming interface (API) of HOOK application.

The process of capturing an image rendered with D3D rendering technology is described in detail below.

It should be noted that function present( ) needs to be called when the image is rendered by D3D rendering technology.

The specific process is: function present( ) is replaced with a first image acquiring function. When rendering a picture by calling the present( ) function each time with the D3D rendering technique, the first picture taking function will be called each time to achieve image capturing. Herein, the first image acquiring function may be used to acquire a back buffer image (that is, an image to be displayed).

In addition, after image capturing is achieved by the first image acquiring function achieves, function present( ) is called again to implement an exchange between a front buffer image and a back buffer image (rendering an image). Herein, function present( ) is used to exchange a front buffer image (an image that is being displayed) with a back buffer image (an image to be displayed).

It should be noted that there is a certain instability in game capturing. Since application programming interface (API) of game capturing HOOK application needs to acquire local administrator's permission, if administrator's permission cannot be acquired, the game cannot capture the image output by the first application.

In the present disclosure, if the first information associated with the first application exists in the first database, the image output by the first application in the capturing fashion associated with the image (the video image) output by the first application is captured based on the first capturing policy, and otherwise, the image output by the first application is captured based on the second capturing policy.

Figure 3:
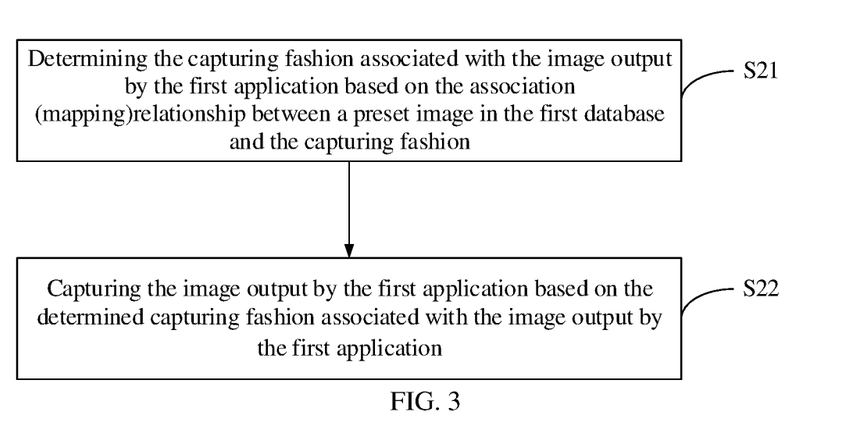
FIG. 3 is a schematic flowchart of capturing an image output by a first application based on a first capturing policy according to the present disclosure.

In the present disclosure, capturing the image (the video image) output by the first application in the capturing fashion associated with the image output by the first application based on the first capturing policy, as shown in FIG. 3, the step S102 may include but not be limited to the following steps.

In step S21, the capturing fashion associated with the image output by the first application is determined based on an association (mapping) relationship between a preset image in the first database and the capturing fashion.

The association (mapping) relationship between the preset image in the first database and the capturing fashion is described in detail below with reference to Table 1.

TABLE 1

| The game name | Process 1 | Process 2 | Process 3 |
|---|---|---|---|
| League of Leagends | Client.exe:0 | LolClient.exe:0 | League of Legends.exe:3 |
| FIFA Online 3 | FIFA Online 3.exe:0 | | |
| Devilmaycy | DMC-Deilmaycry.exe:1 | Devilmaycry4_DX10.exe:0 | |

Wherein 0 indicates to automatically detect which capturing fashion (window capturing, the window capturing fashion configured with attribute of WS_EX_LAYERED, or game capturing fashion) is suitable for use, 1 indicates that the window capturing fashion configured with attribute of WS_EX_LAYERED is forced to be used, 2 indicates that the window capturing fashion is forced to be used, and 3 indicates that game capturing fashion is forced to be used.

In combination with Table 1, taking the gaming application named "League of Legends" as an example, the gaming application may include but not be limited to the following 3 processes.

Process 1: game logon (Client).
Process 2: launching PVP.Net client (LolClient).
Process 3: gaming (League of Legends).

As can be seen from Table 1 that the capturing fashion associated with (mapping) process 1 is capturing fashion 0, the capturing fashion associated with (mapping) process 2 is the capturing fashion 0, and the capturing fashion associated with (mapping) process 3 is capturing fashion 3.

It should be noted that because images output by process 1 and process 2 are not provided with a full screen mode, the images output by process 1 and process 2 may be captured with any one of the window capture, the window capturing fashion configured with attribute of WS_EX_LAYERED, and the game capturing fashion.

In particular, for example, for a window in a live broadcast room of a live streaming platform, since the window is provided with attribute of WS_EX_LAYERED, it needs to use the window capturing fashion configured with attribute of WS_EX_LAYERED to capture the image. Particularly, first, a device context of a designation window may be acquired by the function GetDC(hwnd), wherein hwnd is used to characterize handle of the designation window. Then, mipmaps in the device context may be copied by the function BitBit(captureBit) to achieve capturing the window image with attribute of WS_EX_LAYERED rendered with GDI rendering technology.

In addition, an image output by the process 3 is mainly in a full screen mode, therefore, the game capturing fashion (capturing fashion 3) is used to capture the image output by the process 3.

In step S22, the image output by the first application is captured based on the determined capturing fashion associated with the image output by the first application.

Figure 4:
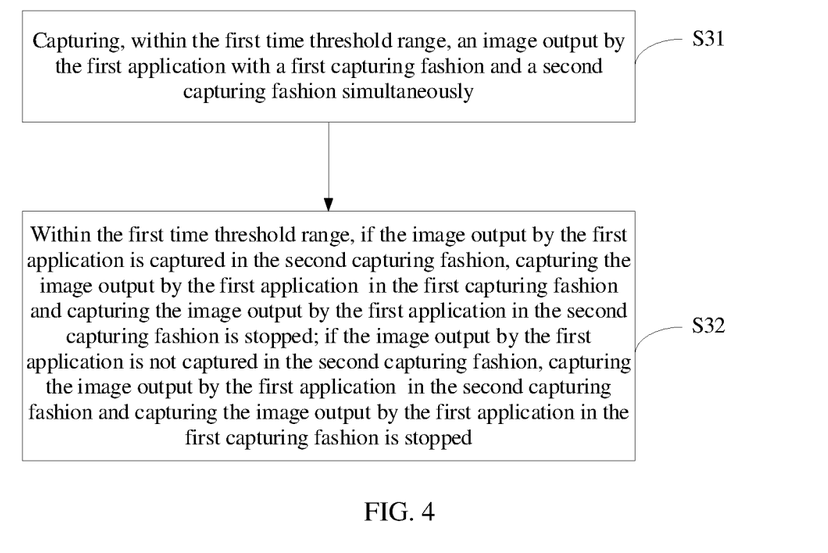
FIG. 4 is a schematic flowchart of capturing an image output by a first application based on a second capturing policy according to the present disclosure.

Optionally, an image output by the first application is captured based on the second policy, as shown in FIG. 4, the step S103 may include but not be limited to the following steps.

In step S31, within the first time threshold range, the image output by the first application is captured in a first capturing fashion and a second capturing fashion simultaneously.

Particularly, the first capturing fashion may include but not be limited to window capturing or display capturing. The second capturing fashion may include game capturing. It should be noted that only when a game image is drawn, the image can be captured by the game capturing.

Herein, the first time threshold is configurable, preferably, the first time threshold may be 15 seconds. The first time threshold is associated with the application (such as, a gaming application). That is to say, the first time threshold associated with different application is different. For example, compared with some simple gaming applications that take up relatively less memory, the first time threshold associated with some relatively complicated gaming applications that take up more memory has a relatively large value, such as 15.5 seconds, 16 seconds, or the like. That reason is that, compared with a simple gaming application that takes up less memory, the relatively complicated gaming application that takes up more memory needs longer start time.

Therefore, from the perspective of using a reasonable capturing fashion, with regard to the complicated gaming application that takes up relatively more memory, the first time threshold may be set relatively larger; otherwise, an image output by an application that is suitable for using the second capturing fashion to capture uses the first capturing fashion to capture instead. For details, reference may be made to step two below.

Optionally, the first time threshold is associated with the device for running the application, such as, gaming application. That is to say, the first time threshold associated with the device for running different application is different. For example, compared with some devices for running an application with a higher hardware configuration, such as, Central Processing Unit (CPU) frequency, the number of CPUs, or random-access memory (RAM) size of CPU, some devices for running an application with a lower hardware configuration have relatively larger time threshold, such as 15.5 seconds, 16 seconds, or the like. The reason is that, compared with some devices for running an application with a higher hardware configuration, the devices for running an application with a lower hardware configuration need a relatively longer startup time.

Therefore, from the perspective of using the reasonable capturing fashion, with regard to some devices for running an application with a lower hardware configuration, the first time threshold may be set relatively larger; otherwise, an image output by an application that is suitable for using the second capturing fashion to capture uses the first capturing fashion to capture instead. For details, reference may be made to step S32 below.

In step S32, within the first time threshold range, if the image output by the first application is captured in the second capturing fashion, the image output by the first application is captured in the first capturing fashion and capturing the image output by the first application in the second capturing fashion is stopped; if the image output by the first application is not captured in the second capturing fashion, the image output by the first application is captured in the second capturing fashion and capturing the image output by the first application in the first capturing fashion is stopped.

Optionally, an encoded image may be acquired by encoding the image output by the first application in the first capturing fashion or the second capturing fashion. Moreover, the encoded image may be sent to a server. Herein, the server may be a live streaming platform server.

Optionally, prior to capturing the image output by the first application in the second capturing fashion, the method further includes:

acquiring an encoded image by encoding the captured image output by the first application in the first capturing fashion; and sending the encode image to a server.

The reason why when the application starts up, the image output by the first application is captured in in first capturing fashion prior to the second capturing fashion is described in detail below is as follows.

When the application is started, the image drawing is started after more resources are loaded. The image may be captured in the second capturing fashion only when the application is rendering (drawing) an image; however, the image may be captured in the first capturing fashion once the application starts up, therefore, the image may be captured in the first capturing fashion prior to the second capturing fashion.

Optionally, if the window of the image output by the first application is minimized, the first time threshold may be reset.

Particularity, when the window of the image output by the first application is minimized, the first time threshold may be reset. When the image output by the first application is maximized, within the reset first time threshold, the image may be captured in the first capturing fashion and second capturing fashion simultaneously.

It should be noted, if the image output by the first application is captured in the second capturing fashion, the image output by the first application is captured in the first capturing fashion and capturing the image output by the first application in the second capturing fashion is stopped at the same time. The reason is that, compared with the first capturing fashion, the second capturing fashion is more efficient. In addition, compared with the first capturing fashion, the second capturing fashion can only take fewer RAM resources of the processor in capturing the image output by the first application.

In summary, the present disclosure provides a method for capturing an image. Particularly, in the present disclosure, the image output by first application can be captured based on a first capturing policy or a second capturing policy, and the image output by first application can generally be captured smoothly, thereby solving the problem that an image can be captured due to an incorrect capturing fashion, and preventing a black screen from happening during live streaming of an anchor. Therefore, user's experience can be improved significantly by using the present disclosure.

Figure 5:
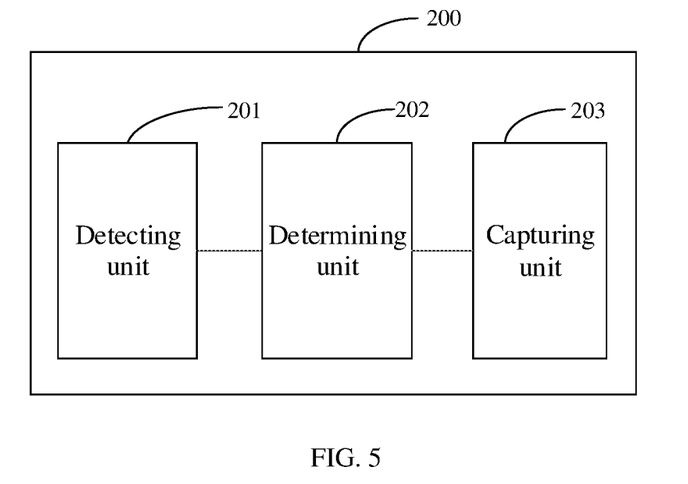
FIG. 5 is a schematic block diagram of a terminal according to the present disclosure.

To facilitate implementation of the embodiments of the present disclosure, the present disclosure provides a terminal to implement the method described in the embodiments shown in FIG. 1. FIG. 5 is a schematic block diagram of a terminal according to the present disclosure. As shown in FIG. 5, the terminal 200 may include: a detecting unit 201, a determining unit 202, and a capturing unit 203.

The detecting unit 201 is configured to detect first information associated with a first application that is running. The first information is configured to characterize an attribute of the first application.

The capturing unit 203 is configured to capture an image output by the first application in the capturing fashion associated with the image output by the first application based on the first capturing policy if the first information associated with the first application exists in the first database.

The capturing unit 203 is further configured to capture the image output by the first application based on a second capturing policy if the first information associated with the first application does not exist in the first database.

Optionally, as shown in FIG. 5, the terminal further includes a determining unit 202, configured to determine whether the first information associated with a first application exists in a first database, wherein the first database may include first information associated with an application and a capturing fashion associated with an image output by the application.

Optionally, the determining unit 202 is further configured to: compare the first information associated with the first application with the data in the first database to determine whether the first information associated with the first application exists in the first database.

It should be noted that the first database may be established based on the recorded capturing fashions corresponding to the images output by the respective applications (such as, a gaming application) that have been successfully captured, wherein different images correspond to different capturing fashions It should be noted that, the first database may be stored in, but not be limited to the following two ways:

In the first way, the first database may be stored locally in the terminal;

In the second way, the first database may be stored in a cloud server connected to the terminal locally.

It should be noted that the first database may be established in the recorded capturing fashions corresponding to the images that have been successfully captured by the respective applications (such as, a gaming application), wherein different images correspond to different capturing fashions.

The capturing unit 203 is further configured to:

capture the image (a video image) output by the first application in the capturing fashion associated with the image output by the first application based on the first capturing policy, including but not be limited to the following steps.

In step one, the capturing fashion associated with the image output by the first application is determined based on the association (mapping) relationship between a preset image in the first database and the capturing fashion.

In step two, the image output by the first application is captured based on the determined capturing fashion associated with the image output by the first application.

Optionally, the image output by the first application is captured based on the second capturing policy, including but not be limited to the following steps.

In step one, within the first time threshold range, the image output by the first application is captured in the first capturing fashion and the second capturing fashion simultaneously.

It should be noted that, the first capturing fashion may include but not be limited to a window capturing or display capturing. The second capturing fashion may include game capturing.

Herein, the first time threshold is configurable, preferably, the first time threshold may be 15 seconds. The first time threshold is associated with the application (such as, a gaming application). That is to say, the first time threshold associated with different applications is different. Compared with some simple gaming applications that take up relatively less memory, the first time threshold associated with some relatively complicated gaming applications that take up more memory has a relatively large value. Compared with the simple gaming applications that take up relatively less memories, the startup time of the complicated gaming applications that take up relatively more memory is relatively longer. Therefore, from the perspective of using a reasonable capturing fashion, with regard to the complicated gaming applications that take up relatively more memory, the first time threshold may be set relatively larger; otherwise, an image output by an application that is suitable for using the second capturing fashion to capture uses the first capturing fashion to capture instead. For details, reference may be made to step two below.

Optionally, the first time threshold is associated with the device for running an application (such as, a gaming application). That is to say, the first time threshold associated with a device for running different applications is different. For example, compared with some devices for running an application with a higher hardware configuration (such as, CPU frequency, number of CPU, or RAM size of CPU), some devices for running an application with a lower hardware configuration have a relatively larger time threshold. The reason is that, compared with some devices for running an application with a higher hardware configuration, the devices for running an application with a lower hardware configuration need a relatively longer startup time.

Therefore, from the perspective of using the reasonable capturing fashion, with regard to some devices for running an application with a lower hardware configuration, the first time threshold may set relatively larger, otherwise, an image output by an application that is suitable for using the second capturing fashion to capture uses the first capturing fashion to capture instead. For details, reference may be made to step two below.

In step two, within the first time threshold range, if the image output by the first application is captured in the second capturing fashion, the image output by the first application is captured in the first capturing fashion and capturing the image output by the first application in the second capturing fashion is stopped; if the image output by the first application is not captured in the second capturing fashion, the image output by the first application is captured in the second capturing fashion and capturing the image output by the first application in the first capturing fashion is stopped.

Besides a detecting unit 201, a determining unit 202, and a capturing unit 203, the terminal 200 may further include an encoding unit and a sending unit (not shown in FIG. 5).

The encoding unit is configured to acquire an encoded image by encoding the captured image output by the first application in the first capturing fashion or the second capturing fashion.

The sending unit is configured to send the image captured in the first capturing fashion or the second capturing fashion after being encoded by the encoding unit to a server. In the present disclosure, the server may be a live streaming platform server.

The encoding unit is further configured to prior to capturing the image output by the first application is captured in the second capturing fashion, acquire an encoded image by capturing the image output by the first application in the first capturing fashion.

The sending unit is further configured to send the image captured in the first capturing after being encoded by encoding unit to the server.

The reason why when the application starts up, the image output by the first application is captured in the first capturing fashion prior to the second capturing fashion is described in detail below is as follows.

When the application is started, the image drawing is started after more resources are loaded. The image may be captured in the second capturing fashion only when the application is rendering (drawing) the image; however, the image may be captured in the first capturing fashion once the application starts up, therefore, the image may be captured in the first capturing fashion prior to the second capturing fashion.

Besides the detecting unit 201, the determining unit 202, the capturing unit 203, the terminal 200, the encoding unit, and the sending unit, the terminal 200 may include a resetting unit (not shown in FIG. 5).

The resetting unit is configured to reset the first time threshold if the window of the image output by the first application is minimized.

Particularity, when the window of the image output by the first application is minimized, the first time threshold may be reset. When the image output by the first application is maximized, within the reset first time threshold, the image may be captured in the first capturing fashion and second capturing fashion simultaneously.

It is can be understood that a specific implementation of the functional modules included in the terminal 200 shown in FIG. 5 may be referred to the foregoing embodiments and is not described herein again.

Figure 6:
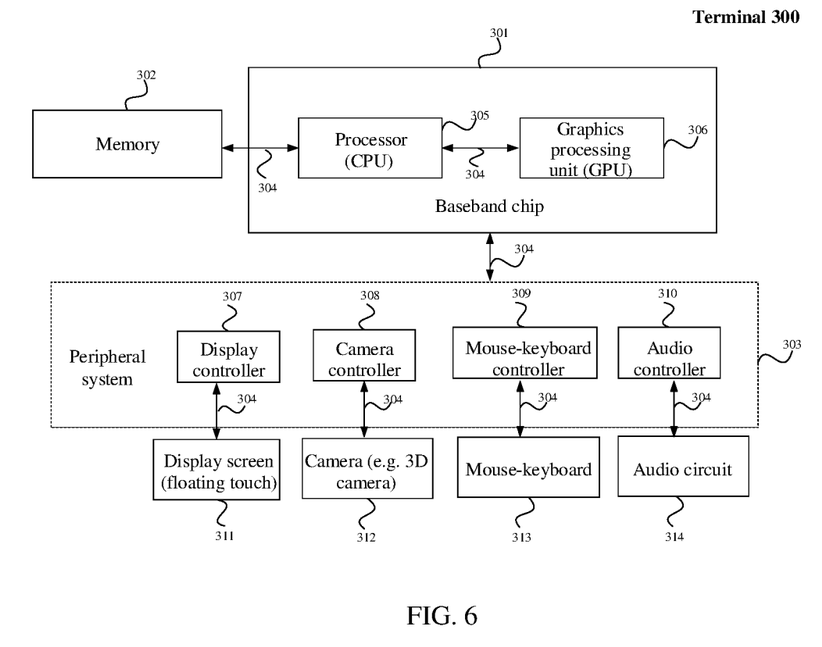
FIG. 6 is a schematic block diagram of another terminal according to the present disclosure.

FIG. 6 is a schematic block diagram of another terminal provided by the present disclosure. In the embodiments of the present disclosure, the terminal may include a mobile phone, a tablet, a personal digital assistant (PDA), a mobile internet device (MID), a wearable smart device (such as, a smart watch, a smart bracelet), and the like, which is not limited in the present disclosure. As shown in FIG. 6, the terminal 300 may include a baseband chip 301, a memory 302 (one or more computer-readable storage media), and a peripheral system 303. These components may communicate on one or more communication buses.

The baseband chip 301 includes one or more processors (CPU) 305 and one or more graphics processing units (GPU) 306.

It should be understood that the processor 305 may be used to capture the image output by the first application. The graphics processing unit 306 may be used to render (draw) the image output by the first application.

The memory 302 coupled with the processor 305 may be used to store all kinds of software programs and/or a plurality of sets of instructions. In a specific implementation, the memory 302 may include a high-speed random access memory and may also include a non-volatile memory, such as one or more disk storage devices, a flash memory device, or other non-volatile solid-state storage devices. The memory 302 may store an operating system (hereinafter referred to as "system"), for example, an embedded operating system such as ANDROID, IOS, WINDOWS, LINUX, or the like. The memory 302 may further restore a network communication program. The communication program may be used to communicate with one or more add-on devices, one or more terminals, and one or more network devices. The memory 302 may also store a user interface program. The user interface program may vividly display the content of an application vividly over a graphical operation interface, and receive a control operation of a user on the application by an input control such as a menu, a dialog box, or a key.

It is to be appreciated that the memory 302 may be used to store the first application and the first information associated with the first application. The first information may be used to characterize the attribute of the first application.

The memory 302 may further store one or more applications. As shown in FIG. 6, these application may include: social applications (such as, Facebook), image management applications (such as, album), map applications (such as, Google maps), and browsers (such as Safari, Google Chrome), and the like.

The peripheral system 303 is mainly used to implement an interaction function between the terminal 300 and a user/external environment, mainly including an input and output device of the terminal 300. In a specific implementation, the peripheral system 303 may include a display controller 307, a camera controller 308, a mouse-keyboard controller 309, and an audio controller 310. Each controller may be coupled with its corresponding peripheral device respectively (such as a display screen 311, a camera 312, a mouse-keyboard 313, and a audio circuit 314). In some embodiments, the display screen 311 may be a display screen configured with a self-capacitance floating touch panel, or may be a display screen configured with an infrared floating touch panel. In some embodiments, the camera 312 may be a 3D camera. It should be noted that the peripheral system 303 may further include other Input/Output (I/O) peripheral devices.

It should be understood that the terminal 300 is only an example provided by the embodiments of the present disclosure. In addition, the terminal 300 may be provided with more or less components than those have been shown, two or more components may be combined, or a component may have different configurations.

It is to be appreciated that the particular implementation of the functional modules included in the terminal 300 shown in FIG. 6 can be referred to the foregoing embodiments and is not be described herein again.

The present disclosure provides a computer-readable storage medium that stores at least one computer program. The at least one computer program is executable by the processor to perform the above method for capturing the image.

The computer-readable storage medium may be any one of the internal storage units in the terminal described in the embodiments above, for example, a hard disk or a memory of the terminal. The terminal may also be an external storage device of the terminal, such as a Plug-in hard disk equipped on the terminal, a smart media card (SMC), a secure digital (SD) card, a flash card, or the like. Furthermore, the computer readable storage medium may also include both the internal storage unit and the external storage device. The computer-readable storage medium is used to store at least one computer program, and other programs and data that are needed by the terminal. The computer-readable storage medium may also be used to temporarily store data that has been output or will be output.

The present disclosure further provides a computer program product. The computer program product includes a non-transitory computer-readable storage medium that stores the computer program. The computer program may be executable by the computer to perform part of or all steps of any one of the methods described in the embodiments above. The computer program product may be a software installation package. The computer includes an electronic device.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing terminal and unit, reference may be made to a corresponding process in the foregoing method embodiments, and details are not described herein again.

In the several embodiments provided in the present disclosure, it should be understood that the disclosed terminal and method may be implemented in other manners. For example, the combination and steps of the embodiment are described. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The described terminal embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by some interfaces. The indirect couplings or communication connections between the terminals or units may be implemented in electronic, mechanical, or other forms.

The units described as separate parts may or may not be physically separate, and parts displayed as units may or may not be physical units, that is, may be located in one position, or may be distributed on a plurality of network units. A part or all of the units may be selected according to actual needs to achieve the objectives of the solutions of the embodiments of the present disclosure.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or a part of the technical solutions may be implemented in the form of a software product. The computer software product is stored in a storage medium and includes several instructions for instructing a computer device (which may be a personal computer, a server, or a network device) to perform all or a part of the steps of the methods described in the embodiments of the present disclosure. The foregoing storage medium includes: any medium that can store program code, such as a USB flash drive, a portable hard disk, a read-only memory (ROM), a random-access memory (RAM), a magnetic disk, or an optical disc.

The above descriptions are merely example embodiments of the present disclosure, but are not intended to limit the protection scope of the present disclosure. Any modification or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for capturing an image, comprising:
   detecting first information associated with a first application that is running, wherein the first information is configured to characterize an attribute of the first application;
   capturing an image output by the first application in a capturing fashion associated with the image output by the first application based on a first capturing policy in the case that the first information associated with the first application exists in the first database; and
   capturing the image output by the first application based on a second capturing policy in the case that the first information associated with the first application does not exist in the first database, wherein capturing the image output by the first application based on the second capturing policy comprises:

attempting to capture, within a first time threshold range, the image output by the first application in a first capturing fashion and a second capturing fashion simultaneously; and continuing capturing, within the first time threshold range, the image output by the first application in the second capturing fashion and stopping capturing the image output by the first application in the first capturing fashion if the image output by the first application is captured in the second capturing fashion; continuing capturing the image output by the first application in the first capturing fashion and stopping capturing the image output by the first application in the second capturing fashion if the image output by the first application is not captured in the second capturing fashion.

2. The method according to claim 1, further comprising:
acquiring an encoded image by encoding the captured image output by the first application based on the first capturing policy or the second capturing policy; and
sending the encoded image to a server.

3. The method according to claim 1, wherein capturing the image output by the first application in the capturing fashion associated with the image output by the first application based on the first capturing policy comprises:
determining the capturing fashion associated with the image output by the first application based on an association relationship between a preset image in the first database and the capturing fashion;
capturing the image output by the first application in the determined capturing fashion associated with the image output by the first application.

4. The method according to claim 1, wherein prior to capturing the image output by the first application in the second capturing fashion, the method further comprises:
acquiring an encoded image by encoding the captured image output by the first application in the first capturing fashion; and
sending the encoded image to a server.

5. The method according to claim 4, further comprising:
resetting the first time threshold if a window of the image output by the first application is minimized.

6. The method according to claim 4, wherein
the first capturing fashion comprises: window capturing or display capturing; the second capturing fashion comprises: game capturing.

7. The method according to claim 1, further comprising:
resetting the first time threshold if a window of the image output by the first application is minimized.

8. The method according to claim 1, wherein
the first capturing fashion comprises: window capturing or display capturing; the second capturing fashion comprises: game capturing.

9. A terminal, comprising a processor, an input device, an output device, and a memory that are connected to each other, wherein the memory is configured to store at least one application program code, the processor is configured to call the at least one program code to perform the following steps of a method:
detecting first information associated with a first application that is running, wherein the first information is configured to characterize an attribute of the first application;

capturing an image output by the first application in a capturing fashion associated with the image output by the first application based on a first capturing policy in the case that the first information associated with the first application exists in the first database; and capturing the image output by the first application based on a second capturing policy in the case that the first information associated with the first application does not exist in the first database, wherein capturing the image output by the first application based on the second capturing policy comprises:

attempting to capture, within a first time threshold range, the image output by the first application in a first capturing fashion and a second capturing fashion simultaneously; and continuing capturing, within the first time threshold range, the image output by the first application in the second capturing fashion and stopping capturing the image output by the first application in the first capturing fashion if the image output by the first application is captured in the second capturing fashion; continuing capturing the image output by the first application in the first capturing fashion and stopping capturing the image output by the first application in the second capturing fashion if the image output by the first application is not captured in the second capturing fashion.

10. The terminal according to claim 9, wherein the method further comprises:
acquiring an encoded image by encoding the captured image output by the first application based on the first capturing policy or the second capturing policy; and
sending the encoded image to a server.

11. The terminal according to claim 9, wherein capturing the image output by the first application in the capturing fashion associated with the image output by the first application based on the first capturing policy comprises:
determining the capturing fashion associated with the image output by the first application based on an association relationship between a preset image in the first database and the capturing fashion;
capturing the image output by the first application in the determined capturing fashion associated with the image output by the first application.

12. The terminal according to claim 9, wherein prior to capturing the image output by the first application in the second capturing fashion, the method further comprises:
acquiring an encoded image by encoding the captured image output by the first application in the first capturing fashion; and
sending the encoded image to a server.

13. The terminal according to claim 9, wherein the method further comprises:
resetting the first time threshold if a window of the image output by the first application is minimized.

14. The terminal according to claim 9, wherein
the first capturing fashion comprises: window capturing or display capturing; the second capturing fashion comprises: game capturing.

15. A computer-readable storage medium storing at least one computer program that includes at least program instruction, wherein the computer program, when run by a processor, enables the processor to perform the following steps of a method:

detecting first information associated with a first application that is running, wherein the first information is configured to characterize an attribute of the first application;

capturing an image output by the first application in a capturing fashion associated with the image output by the first application based on a first capturing policy in the case that the first information associated with the first application exists in the first database; and capturing the image output by the first application based on a second capturing policy in the case that the first information associated with the first application does not exist in the first database, wherein capturing the image output by the first application based on the second capturing policy comprises:

attempting to capture, within a first time threshold range, the image output by the first application in a first capturing fashion and a second capturing fashion simultaneously; and continuing capturing, within the first time threshold range, the image output by the first application in the second capturing fashion and stopping capturing the image output by the first application in the first capturing fashion if the image output by the first application is captured in the second capturing fashion; continuing capturing the image output by the first application in the first capturing fashion and stopping capturing the image output by the first application in the second capturing fashion if the image output by the first application is not captured in the second capturing fashion.

16. The computer-readable storage medium according to claim 15, wherein the method further comprises:

acquiring an encoded image by encoding the captured image output by the first application based on the first capturing policy or the second capturing policy; and sending the encoded image to a server.

17. The computer-readable storage medium according to claim 15, wherein capturing the image output by the first application in the capturing fashion associated with the image output by the first application based on the first capturing policy comprises:

determining the capturing fashion associated with the image output by the first application based on an association relationship between a preset image in the first database and the capturing fashion;

capturing the image output by the first application in the determined capturing fashion associated with the image output by the first application.

18. The computer-readable storage medium according to claim 15, wherein prior to capturing the image output by the first application in the second capturing fashion, the method further comprises:

acquiring an encoded image by encoding the captured image output by the first application in the first capturing fashion; and sending the encoded image to a server.

19. The computer-readable storage medium according to claim 15, wherein the method further comprises:

resetting the first time threshold if a window of the image output by the first application is minimized.

20. The computer-readable storage medium according to claim 15, wherein the first capturing fashion comprises: window capturing or display capturing; the second capturing fashion comprises: game capturing.

* * * * *